US012756123B2

(12) United States Patent
Qiao et al.

(10) Patent No.: US 12,756,123 B2
(45) Date of Patent: Oct. 6, 2026

(54) CONNECTOR ASSEMBLY

(71) Applicant: 3M INNOVATIVE PROPERTIES COMPANY, St. Paul, MN (US)

(72) Inventors: YunLong Qiao, Bukit Timah (SG); Saujit Bandhu, Sengkang (SG); Kok Hoe Lee, Geylang (SG)

(73) Assignee: 3M Innovative Properties Company, St. Paul, MN (US)

( * ) Notice: Subject to any disclaimer, the term of this patent is extended or adjusted under 35 U.S.C. 154(b) by 294 days.

(21) Appl. No.: 18/282,861

(22) PCT Filed: Mar. 22, 2022

(86) PCT No.: PCT/IB2022/052605
§ 371 (c)(1),
(2) Date: Sep. 19, 2023

(87) PCT Pub. No.: WO2022/208234
PCT Pub. Date: Oct. 6, 2022

(65) Prior Publication Data

US 2024/0170878 A1 May 23, 2024

Related U.S. Application Data

(60) Provisional application No. 63/168,459, filed on Mar. 31, 2021.

(51) Int. Cl.
*H01R 13/422* (2006.01)
*H01R 12/72* (2011.01)

(52) U.S. Cl.
CPC ......... *H01R 13/422* (2013.01); *H01R 12/725* (2013.01)

(58) Field of Classification Search
CPC ............................ H01R 13/422; H01R 12/725
(Continued)

(56) References Cited

U.S. PATENT DOCUMENTS

2010/0297885 A1* 11/2010 Cao ........................ H01R 4/028 439/626
2011/0104914 A1* 5/2011 Zhu ...................... H01R 12/724 439/83

(Continued)

FOREIGN PATENT DOCUMENTS

| | | | |
|---|---|---|---|
| CN | 100433466 | C | 11/2008 |
| CN | 202259876 | U | 5/2012 |
| WO | 2021209836 | A1 | 10/2021 |

OTHER PUBLICATIONS

International Search Report for PCT International Application No. PCT/IB2022/052605, mailed on Jun. 20, 2022, 3 pages.

*Primary Examiner* — Tulsidas C Patel
*Assistant Examiner* — Thaslimur Rahman
(74) *Attorney, Agent, or Firm* — Jonathan L. Tolstedt

(57) ABSTRACT

A connector assembly is disclosed. The connector assembly includes a base extending along a Y-axis and a channel extending through the base along an X-axis. A contact is disposed at least partially within the channel, the contact defining a securement portion and at least one additional portion. The securement portion and the additional portion are defined at different points along the contact as measured along the X-axis, and the securement portion secures to the base at the channel. When the securement portion is at least partially disposed within the channel and secured to the base at the channel, the additional portion is disposed lower than the securement portion as measured along the Z-axis.

17 Claims, 6 Drawing Sheets

(58) Field of Classification Search
USPC ........................................................ 439/733.1
See application file for complete search history.

(56) References Cited

U.S. PATENT DOCUMENTS

| | | | | |
|---|---|---|---|---|
| 2014/0302719 | A1 | 10/2014 | Ho | |
| 2016/0164216 | A1* | 6/2016 | Tan ........................ | H01R 12/71<br>439/631 |
| 2017/0085042 | A1* | 3/2017 | Qiao ...................... | H01R 12/57 |

* cited by examiner

CONNECTOR ASSEMBLY

CROSS REFERENCE TO RELATED APPLICATIONS

This application is a national stage filing under 35 U.S.C. 371 of PCT/IB2022/052605, filed Mar. 22, 2022, which claims the benefit of U.S. Provisional Application No. 63/168,459, filed Mar. 31, 2021, the disclosures of which are incorporated by reference in their entireties herein.

BACKGROUND

Servers in data centers require ever-increasing data rates. Improved and standardized connectors offer superior mechanical performance, electrical performance, and cost characteristics over current connector assemblies.

SUMMARY

In some aspects of the present disclosure, a connector assembly is disclosed. The connector assembly can include a base extending along a Y-axis and a channel extending through the base along an X-axis. A contact can be disposed at least partially within the channel, and the contact can define a securement portion and at least one additional portion. The securement portion and the additional portion can be defined at different points along the contact as measured along the X-axis, and the securement portion can secure to the base at the channel. When the securement portion is at least partially disposed within the channel and secured to the base at the channel, the additional portion can be disposed lower than the securement portion as measured along the Z-axis.

In some aspects of the present disclosure, a contact is disclosed. The contact can include a forward portion defining a first width as measured along a Y-axis, a first angled portion defining a second width as measured along the Y-axis, a securement portion defining a third width as measured along the Y-axis, a second angled portion defining a fourth width as measured along the Y-axis, and a rear portion defining a fifth width as measured along the Y-axis, the forward portion, the first angled portion, the securement portion, the second angled portion and the rear portion being arranged sequentially as measured along an X-axis. Each of the second width and the fourth width can be less than each of the first width and the third width.

In some aspects of the present disclosure, a connector assembly is disclosed. The connector assembly can include a base extending along a Y-axis, a channel extending through the base along an X-axis, and a first contact disposed at least partially within the channel. The first contact can define a securement portion having an engagement portion and an extension portion, and the engagement portion can be disposed forward of the extension portion along the X-axis. The engagement portion can secure to the base at the channel A second contact can define a second contact rear portion, and at least a portion of the second contact rear portion can be disposed below, as measured along a Z-axis, the extension portion at a location P, and the second contact rear portion can define a width as measured along a Y-axis at the location P. A distance between the second contact rear portion and the extension portion at the location P, as measured along the Z axis, can be at least as great as the width of the second contact rear portion as measured along the Y-axis at the location P.

DETAILED DESCRIPTION

Figure 1:
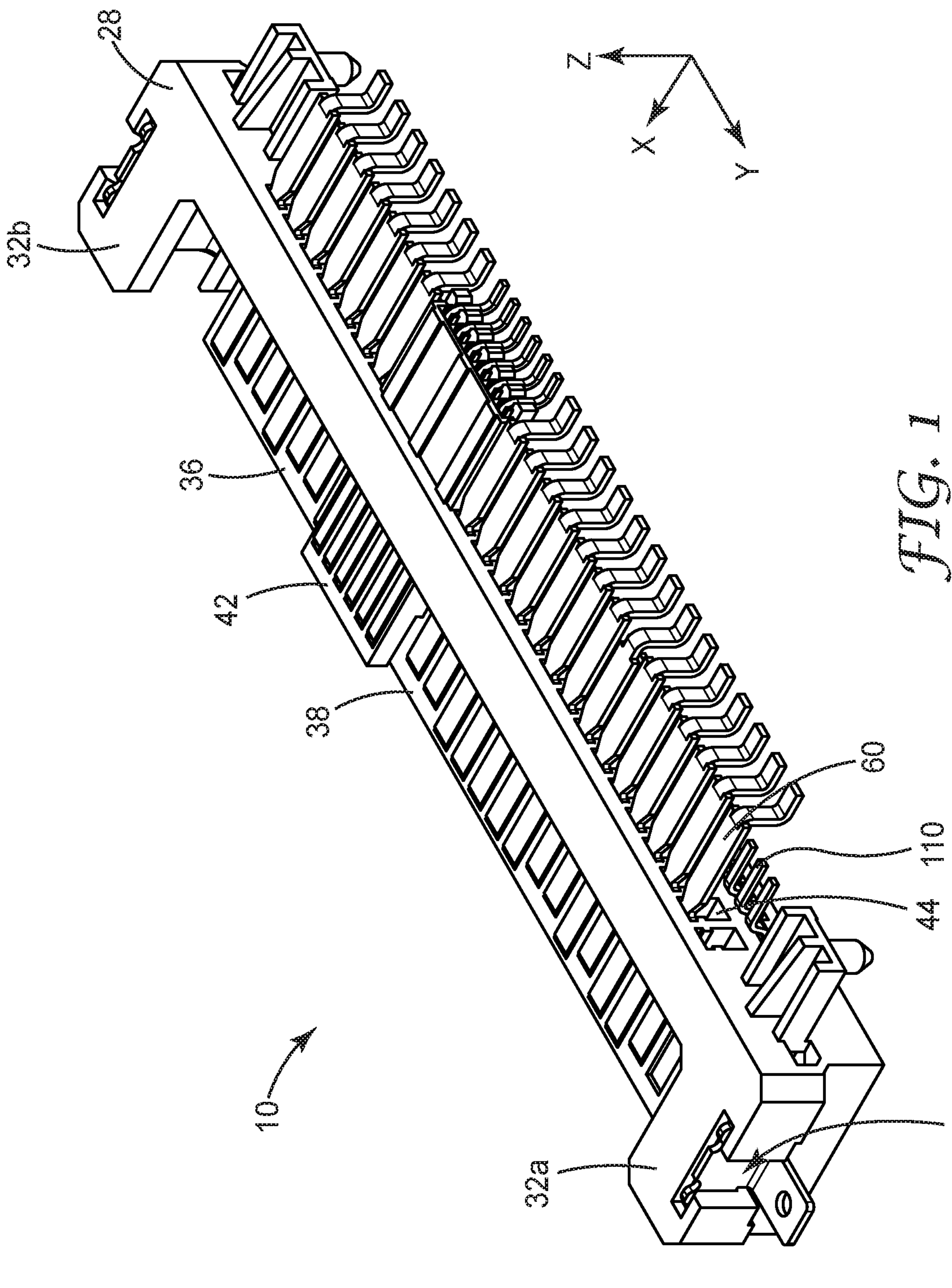
FIG. 1 is an upper rear perspective view of a connector assembly according to exemplary embodiments of the present disclosure.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure. Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a “coincident interface” with, or being “on” “connected to,” “coupled with” or “in contact with” another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being “directly on,” “directly connected to,” “directly coupled with,” or “directly in contact with” another element, there are no intervening elements, components or layers for example.

As used herein, “have”, “having”, “include”, “including”, “comprise”, “comprising” or the like are used in their open-ended sense, and generally mean “including, but not limited to.” It will be understood that the terms “consisting of” and “consisting essentially of” are subsumed in the term “comprising,” and the like.

Electrical connectors are used in many applications, such as to interconnect hard disk drives or solid state drives (SSD) to a motherboard of a computer. Serial advanced technology attachment (SATA) connectors and serial attachment small computer systems interface (SAS) connectors are common types of connectors used in hard disk drive interfaces. According to the Small Form Factor (SFF) specifications, SATA connectors have 22 contacts of which 15 contacts are used for power transmission and 7 contacts (primary signal contacts) are used for data signal transmission. Peripheral component internet express (PCIe) SAS connector is an interface based on the SATA/SAS form factor but utilizing a PCIe signal. In some examples, a connector seat height (a Z or ZH height, as described below in further detail) can be reduced or eliminated. The present disclosure provides for such lower Z height connectors, as well as features that enable improvements in manufacturing processes and component performance for various connectors, such as those with lower Z heights. Further, disclosed embodiments can be used in a PCIe 68P Gen4 connector, which can be suitable for PCIe Gen4 SSD drives.

Figure 2:
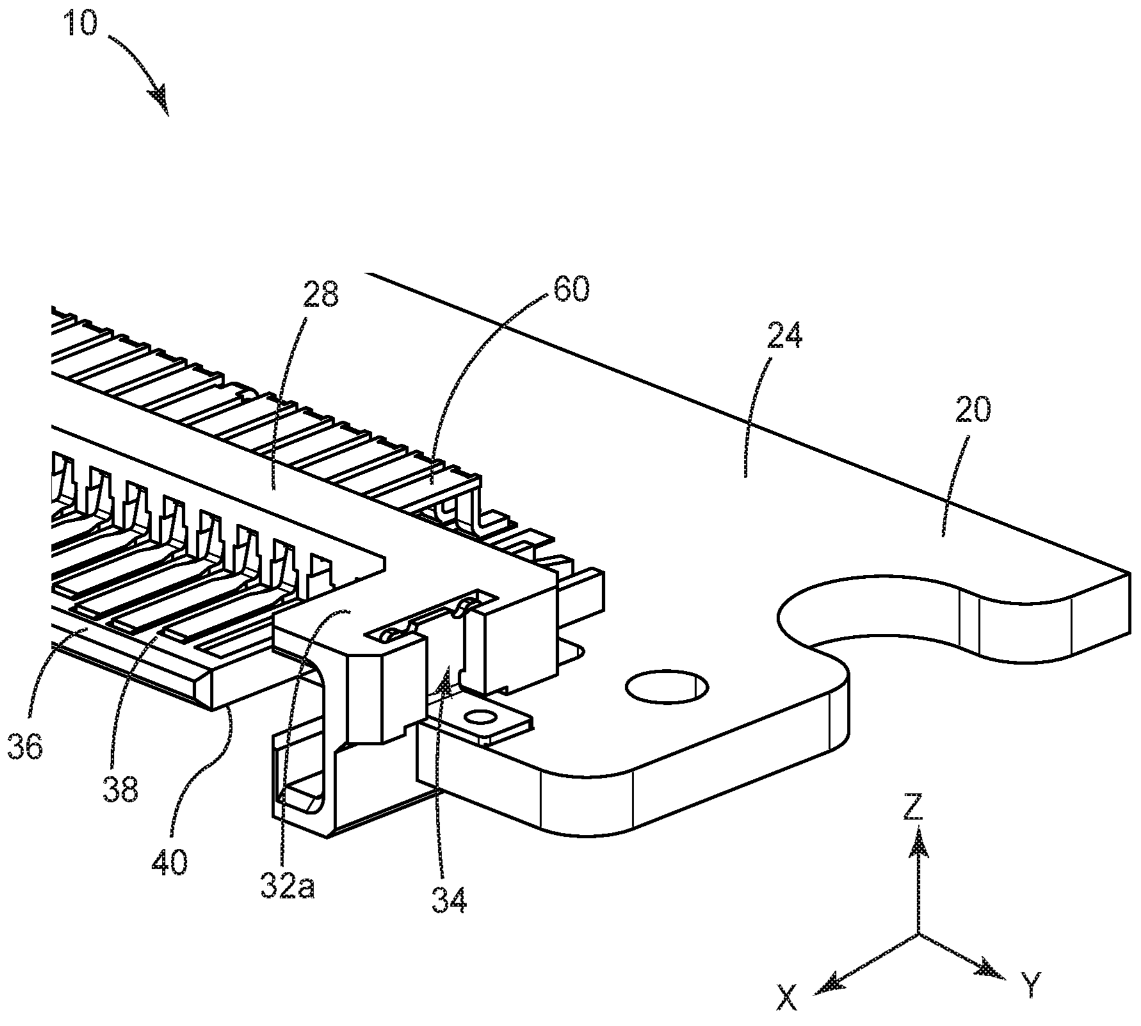
FIG. 2. is an upper front perspective view of a connector assembly according to exemplary embodiments of the present disclosure.

Turning to the figures, FIG. 1 is an upper rear perspective view of a connector assembly according to exemplary embodiments of the present disclosure, and FIG. 2. is an upper front perspective view of a connector assembly according to exemplary embodiments of the present disclosure. A connector assembly 10, Printed Circuit Board (PCB) 20, PCB upper surface 24, and a base 28 can be seen. End walls 32*a*, 32*b*, a secondary tongue 42, and a tongue 36 can extend from the base 28, and the tongue 36 can define an upper surface 38 and a lower surface 40. One or more channels 44 can also be defined in the base 28, as will be described below in further detail. As can be seen in the figures, an X axis can be orthogonal to a Y axis, and each of the X axis and the Y axis can be orthogonal to a Z axis. For clarity, moving upwardly along the Z axis can indicate moving upward vertically in FIG. 1, while moving downwardly along the Z axis can indicate the opposite direction. Moving from the upper right to the lower left along the base in FIG. 1 can indicate moving forwardly along the Y axis, whereas moving in the opposite direction can indicate moving rearwardly along the Y axis. Finally, moving from the upper left to the lower right in FIG. 1, for example along an end wall 32*a*, 32*b*, can indicate moving rearwardly along the X axis, whereas moving in the opposite direction can indicate moving forwardly along the X axis.

The PCB 20 can include silicon, or any other material known to those skilled in the art, and the longest two sides (or dimensions) of the PCB 20 can extend along the X and Y axes. The PCB upper surface 24 can be substantially co-planar with the X and Y directions, and further can be substantially perpendicular to the Z direction. The tongue 36 and secondary tongue 42 can extend forwardly along the X axis from the base 28 and/or from the PCB 20. The upper surface 38 of the tongue 36 can be disposed above the lower surface 40 of the tongue 36 as measured along the Z axis. Portions of each of the upper surface 38 and lower surface 40 can be perpendicular to the Z axis and parallel to the X and Y axes. Further, portions of the lower surface 40 and the upper surface 38 can be, or can substantially be, parallel with one another. The upper surface 38 can define one or more receiving slots 39 (as indicated in FIG. 3) for receiving and/or securing a portion of a first contact 60.

A securement assembly 34 can secure the base 28, end walls 32*a*, 32*b*, tongue 36, secondary tongue 42 and/or other elements of the connector assembly 10 to the PCB 20, and the securement assembly 34 can include any securement technology known to those skilled in the art including, but not limited to, mechanical fasteners, adhesives, magnets and interference fits. The base 28 can extend, along its longest axis or direction, along the Y axis, and further can extend between the end walls 32*a*, 32*b*.

Figure 3:
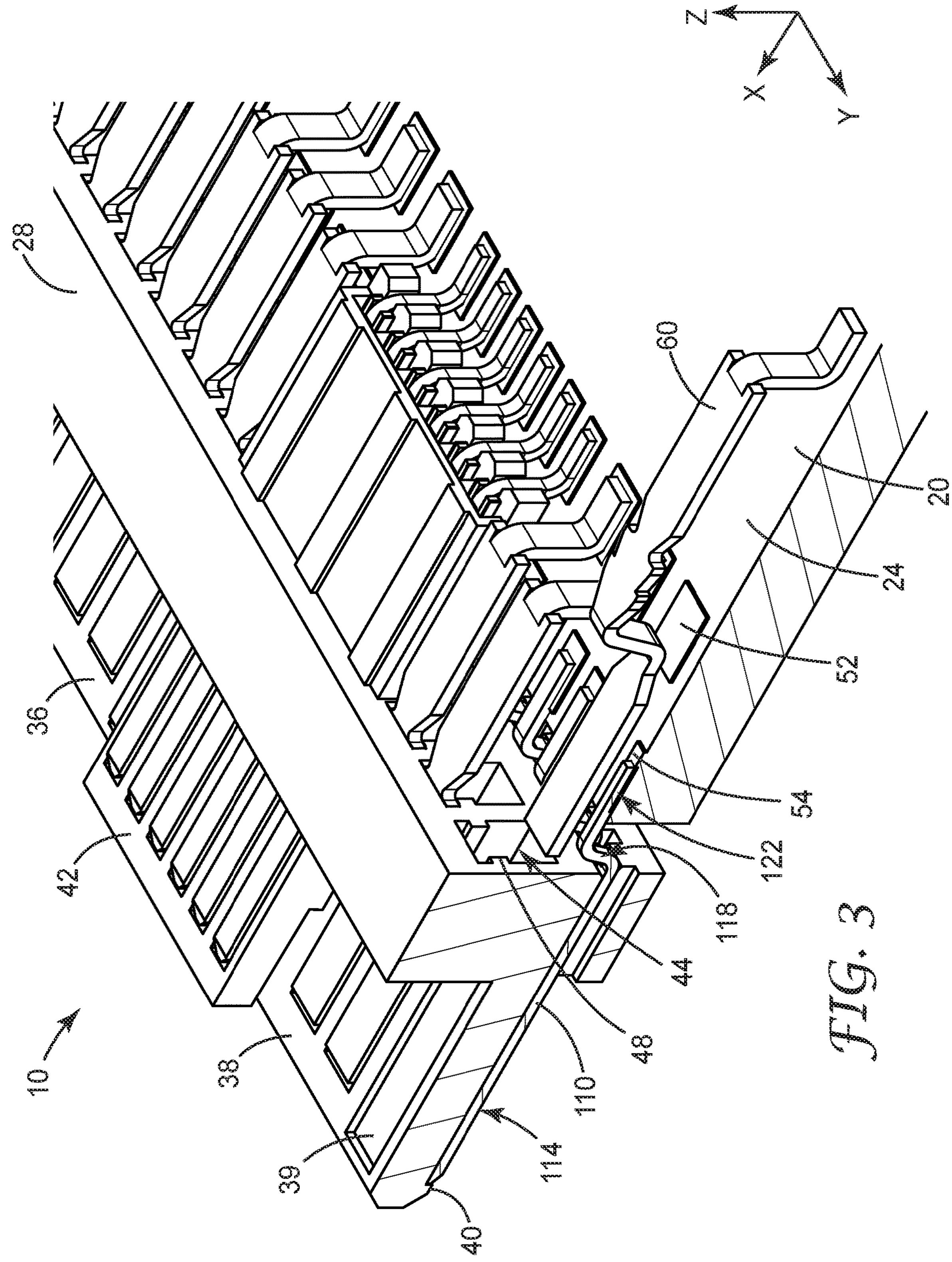
FIG. 3 is a perspective cross-sectional view of a connector assembly, showing a contact removed from a channel, according to exemplary embodiments of the present disclosure.
Figure 4:
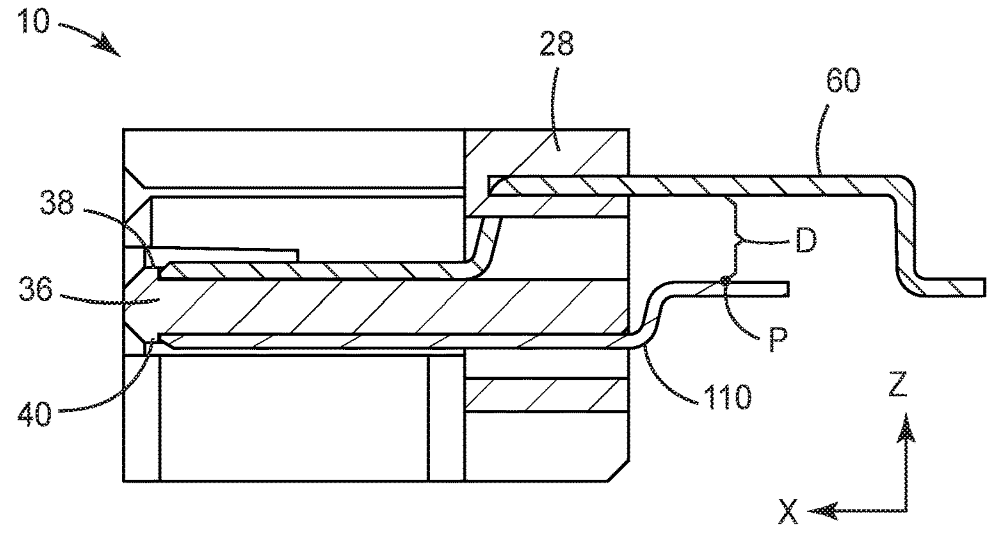
FIG. 4 is a cross-sectional view of a connector assembly, taken along a channel, according to exemplary embodiments of the present disclosure.
Figure 5:
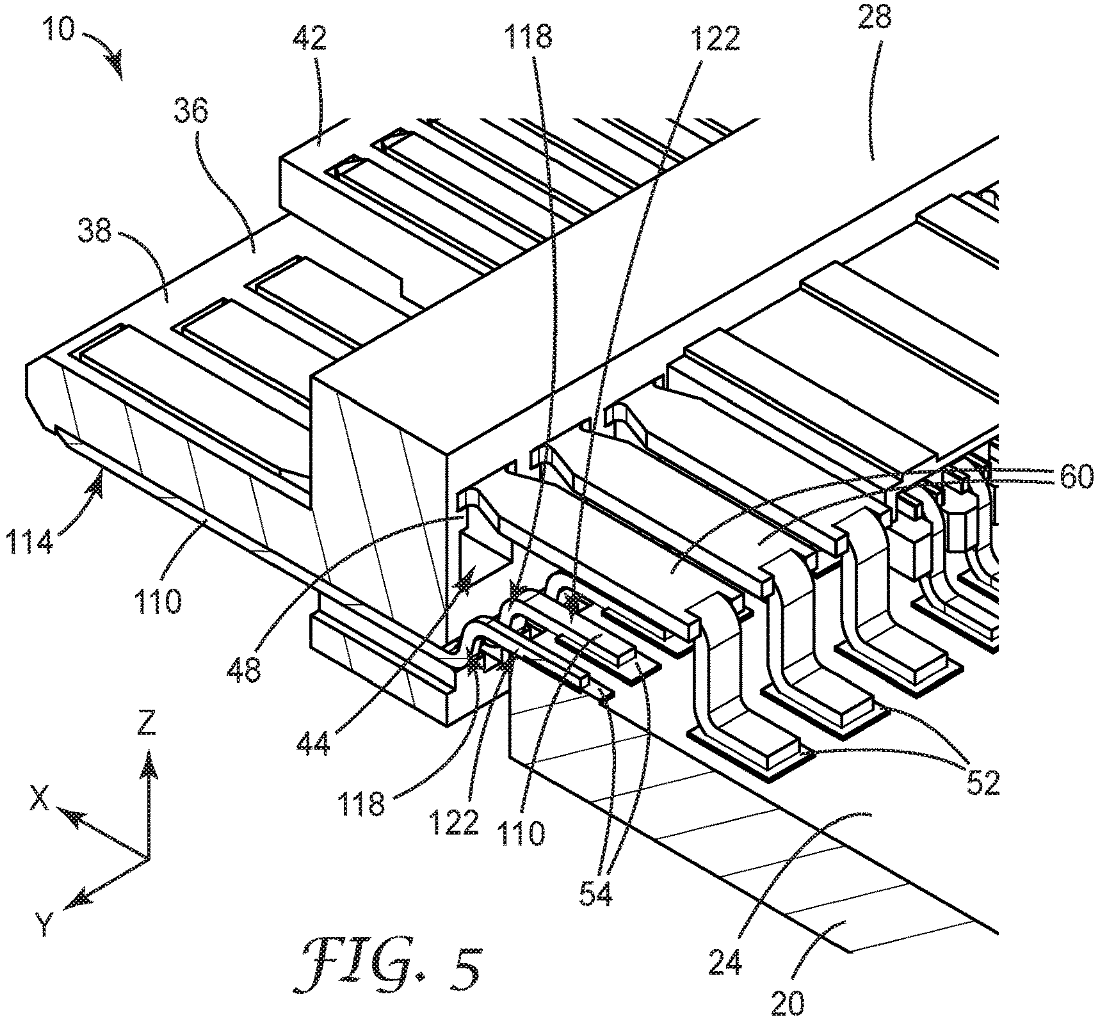
FIG. 5 is a perspective cross-sectional view of a connector assembly, showing a contact within a channel, according to exemplary embodiments of the present disclosure.
Figure 6:
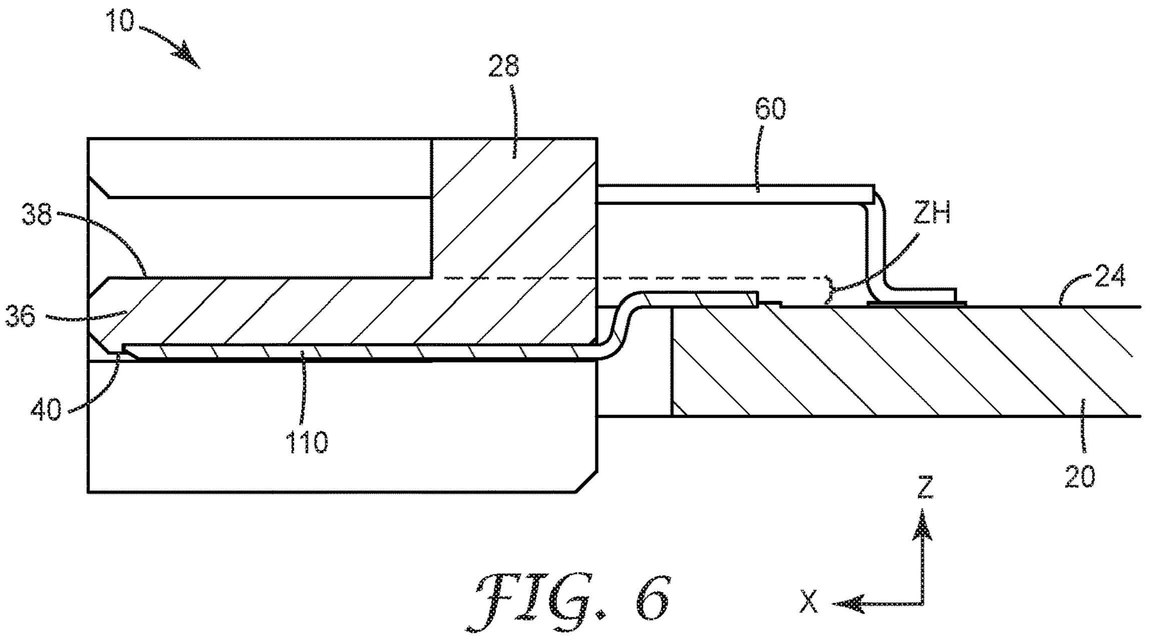
FIG. 6 is a cross-sectional view of a connector assembly, taken along a portion of the connector assembly not including a channel, according to exemplary embodiments of the present disclosure.
Figure 7:
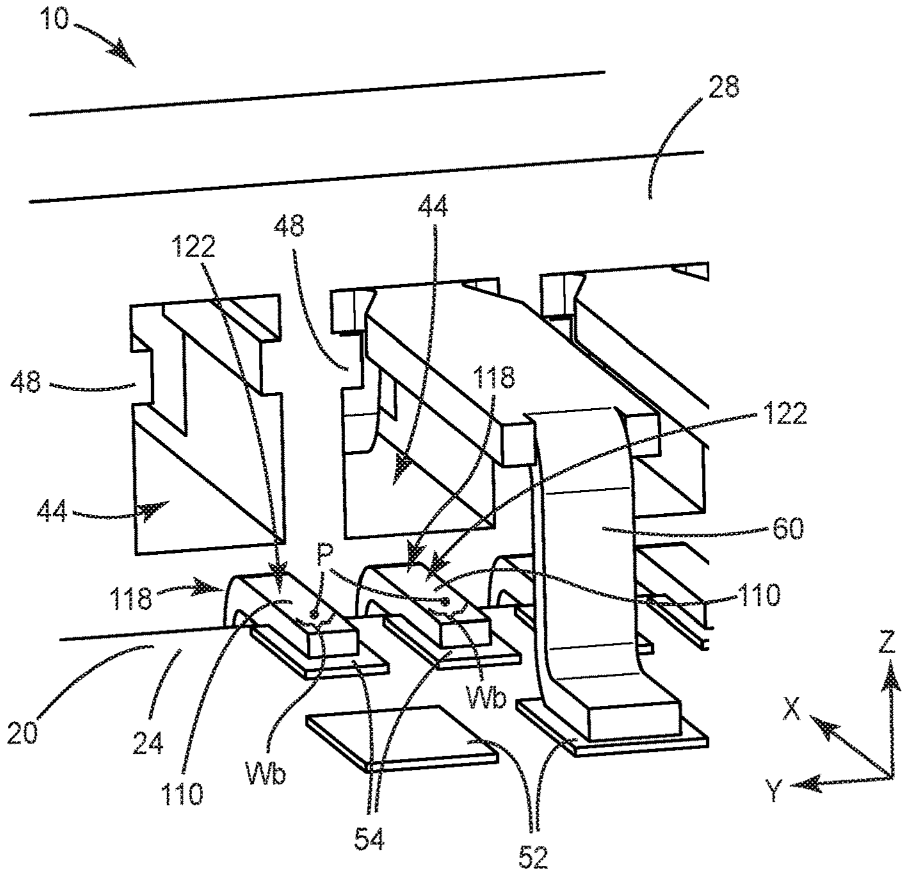
FIG. 7 is an upper rear perspective view of a connector assembly, showing a channel, according to exemplary embodiments of the present disclosure.

Additional features of the present disclosure can be exemplary seen in FIGS. 3-7, among others. FIG. 3 is a perspective cross-sectional view of a connector assembly showing a contact removed from a channel, FIG. 4 is a cross-sectional view of a connector assembly taken along a channel, FIG. 5 is a perspective cross-sectional view of a connector assembly and showing a contact within a channel, FIG. 6 is a cross-sectional view of a connector assembly taken along a portion of the connector assembly not including a channel, and FIG. 7 is an upper rear perspective view of a connector assembly showing a channel.

The channel 44 can pass through the base 28 along an X direction, such that the channel can open at two opposed sides of the base 28 spaced apart along the X direction. In various embodiments, a cross-sectional shape of the channel 44 can be, or can be substantially, different shapes, including square, rectangular, ovular, circular, triangular, pentagonal, hexagonal, octagonal, or any shape known to those skilled in the art.

A channel securement feature 48 can be disposed within, partially within, or proximate a channel 44. Further, portions of the channel securement feature 48 can protrude into the channel 44. As will be described below, the channel securement feature 48 can help secure the first contact 60 within the channel 44 and/or along the X, Y, or Z axes.

The PCB 20 can include one or more first contact pads 52. The first contact pad 52 can be in electrical communication with the first contact 60. The PCB 20 can also include one or more second contact pads 54. The second contact pad 54 can be in electrical communication with a second contact 110, as will be described below in further detail. In various embodiments, the first contact pads 52 can be disposed in a row, which can be along the Y axis, and the second contact pads 54 can also be disposed in a row, which can be along the Y axis.

As exemplarily shown in FIG. 5, portions of the first contact 60 can pass through the channel 44, can be disposed on the upper surface 38, and further can be in electrical communication with the first contact pad 52. Portions of the second contact 110 can be disposed on the lower surface 40 and can be in electrical communication with the second contact pad 54. In some embodiments, a first contact 60 initially separate from the base 28 and PCB 20 (as shown in FIG. 3) can translate forwardly along the X axis so portions of the first contact 60 pass through the channel 44, are disposed on the upper surface 38, and are in electrical communication (and/or physical contact) with the first contact pad (as shown in FIG. 5).

Figure 8:
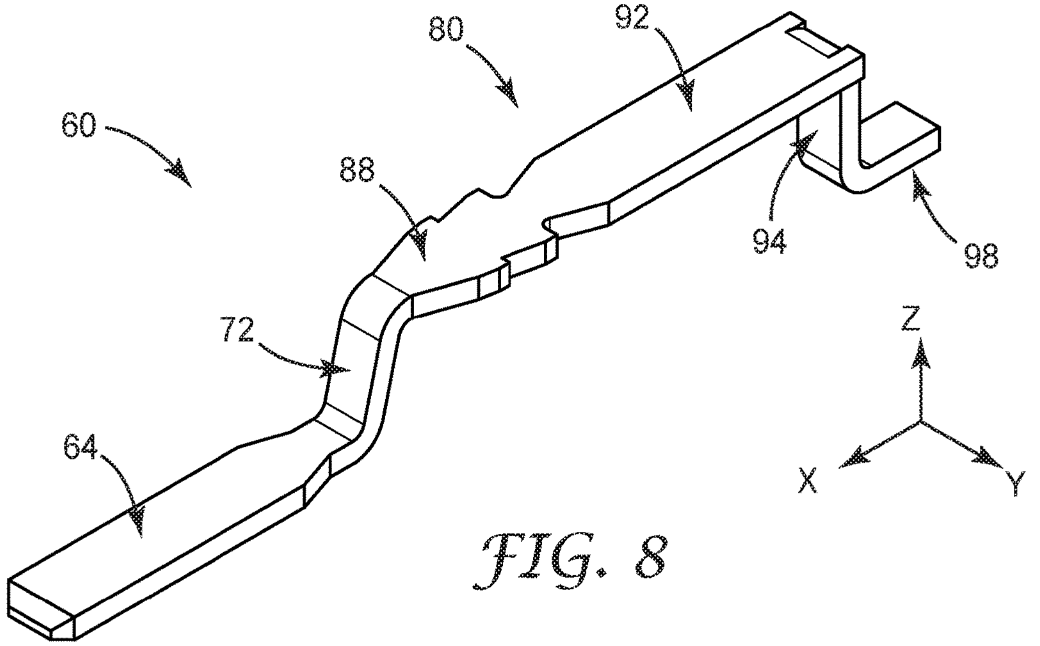
FIG. 8 is an upper front perspective view of a contact according to exemplary embodiments of the present disclosure.
Figure 9:
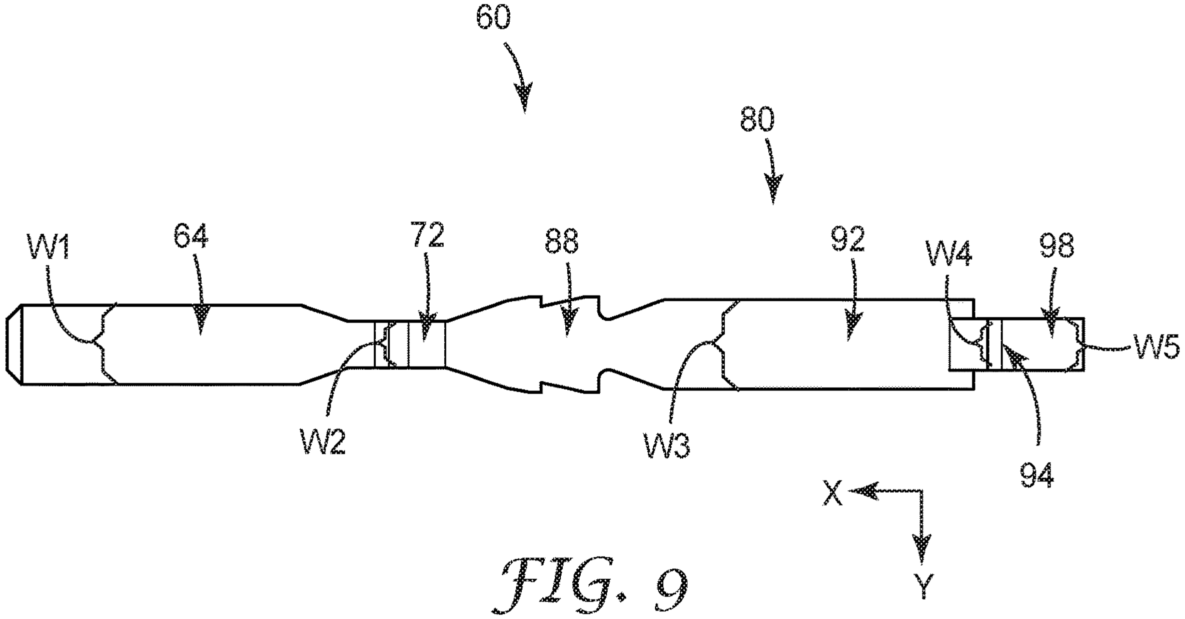
FIG. 9 is a top elevation view of a contact according to exemplary embodiments of the present disclosure.

Turning to FIGS. 8 and 9, FIG. 8 is an upper front perspective view of a first contact and FIG. 9 is a top elevation view of a first contact 60 according to exemplary embodiments of the present disclosure. The first contact 60 can define a plurality of portions, which will now be described moving rearwardly along the X axis. A forward portion 64 can define a width W1, as measured along the Y axis. A first angled (or first bent) portion 72 can define a width W2 as measured along the Y axis. A central (or securement or upper) portion 80 can define a width W3 as measured along the Y axis. The securement portion 80 can include an engagement feature (or engagement portion) 88 and an extension portion 92, and the engagement portion 88 can be located farther forwardly along the X axis than is the extension portion 92. A second angled (or second bent) portion 94 can define a width W4 as measured along the Y axis. Finally, the rear portion 98 can define a width W5 as measured along the Y axis.

In various embodiments, W2 is less than one or more of W1, W3, W4, and W5. In various embodiments, W4 is less than one or more of W1, W2, W3, and W5. In various embodiments, W5 is less than one or more of W1, W2, W3 and W4. In various embodiments, W1 is less than one or more of W2, W3, W4, and W5. Further, in various embodiments, W3 is less than one or more of W1, W2, W4, and W5.

The second contact 110 can define a plurality of portions as exemplarily shown in FIGS. 3 and 5, which will now be described moving rearwardly along the X axis. A forward portion 114, an angled portion 118 and a rear portion 122 can all be defined along the second contact 110, and the rear portion 122 can define a width W6 as measured along the Y axis.

As described, the first contact 60 (initially separate from the base 28 and PCB 20 (as shown in FIG. 3)) can translate forwardly along the X axis so portions of the first contact 60 pass through the channel 44. In various embodiments, the engagement portion 88 engages with portions of the channel 44, channel securement feature 48 and/or base 28 to thereby permanently or releasably secure the first contact 60 within the channel 44. In non-limiting examples, the one or more of the engagement portion 88, channel 44, channel securement feature 48 and base 28 can include prongs, hooks, puncturing elements, press-fit elements, magnets, adhesives, hook-and-loop panels or any other type of mechanical fastener to, releasably or permanently, secure the first contact 60 within the channel 44. Further, in some embodiments, the first contact 60 can be secured and/or bounded along the Z-axis by the channel securement feature and an upper (as measured along the Z axis) surface of the channel 44.

As can be exemplarily seen in FIG. 8, at least a portion of the forward portion 64 can be disposed below portions of the first angled portion 72, the securement portion 80, the second angled portion 94 and/or the rear portion 98, as measured along the Z axis. Further, at least a portion of the rear portion 98 can be disposed below portions of the first angled portion 72, the securement portion 80, the second angled portion 94 and/or the forward portion 64. Additionally, in various embodiments, portions of the first angled portion 72 can be disposed below the securement portion 80 and/or the second angled portion 94 as measured along the Z axis. Finally, in various embodiments, portions of the second angled portion 94 can be disposed below the securement portion 80 and/or the first angled portion 72 as measured along the Z axis.

In some embodiments, the securement portion 80 can be partially disposed within the channel 44 and secured to the base 28 at the channel 44 and/or the channel securement feature 48 while an additional portion of the first contact 60 can be disposed below the securement portion 80 as measured along the Z axis. The additional portion can be one or more of the forward portion 64, the first angled portion 72, the second angled portion 94 and the rear portion 98. In various embodiments, the securement portion 80 can be partially disposed within the channel 44 and secured to the base 28 at the channel 44 and/or the channel securement feature 48 while the additional portion of the first contact 60 can be disposed forward or rearward of the securement portion 80 as measured along the X axis.

Turning to FIG. 7, the second contact 110 can be seen, and can further define a second contact angled portion 118 and a second contact rear portion 122. The second contact rear portion 122 can define a width W6, which can be measured along the Y axis and can be substantially perpendicular to a longitudinal direction of the second contact 110. The width W6 can be defined at a point P on the rear portion 112. As exemplarily shown in FIG. 4, a distance D between point P on the rear portion 112 and one or more of the first contact 60, securement portion 80, engagement portion 88 and/or extension portion 92 can be, in various embodiments, at least, at most, equal to or about 50%, 75%, 100%, 125%, 150%, 200%, 250%, 300%, 350%, 400%, 450% or 500% of W6. Greater distances between portions of the first and second contacts 60, 110 can enable reduced electrical noise between these elements.

The disclosed embodiments provide numerous benefits and mechanisms for the efficient, secure and stable operation of a connector assembly 10. FIG. 6 exemplarily shows a height ZH between the PCB upper surface 24 and the tongue upper surface 38 as measured along the Z axis. In various embodiments, a height ZH enabled by elements of the present disclosure is less than a height of conventional connector designs. New shapes of the first contact 60, base 28, channel 44, and other elements of the present disclosure allow an easy and efficient manufacture of the connector assembly 10 while further enabling a reduced height ZH. In particular, exemplary differing heights (as measured along the Z axis) of portions of the first contact 60 allow a lower forward portion 64 and a relatively higher engagement portion 88 to facilitate a reduced height ZH.

In some embodiments, one or more of the PCB 20, base 28, first contact pad 52, second contact pad 54, first contact 60, second contact 110, or any constituent element thereof, can be cast, molded, machined or otherwise formed as a single, integral component. In some embodiments, the PCB 20, base 28, first contact pad 52, second contact pad 54, first contact 60, second contact 110, or any constituent element thereof, can be formed of or can include a metal, metal alloy, polymer, composite material, ceramic, organic material, electrically-conductive material, electrical insulator, or any other material known to those skilled in the art.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure. The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control.

What is claimed is:

1. A connector assembly, comprising:

a base extending along a Y-axis;

a channel extending through the base along an X-axis, opening at two opposed sides of the base spaced apart along the X-axis and comprising a channel engagement feature; and a contact disposed at least partially within the channel, the contact defining a securement portion and at least one additional portion, the securement portion and the additional portion being defined at different points along the contact as measured along the X-axis, the securement portion securing to the base at the channel by engaging the channel engagement feature;

wherein, when the securement portion is at least partially disposed within the channel and secured to the base at the channel, the additional portion is disposed lower than the securement portion as measured along the Z-axis.

2. The connector assembly of claim 1, wherein the additional portion is disposed forward of the securement portion as measured along the X-axis.

3. The connector assembly of claim 1, wherein the additional portion is disposed rearward of the securement portion as measured along the X-axis.

4. The connector assembly of claim 1, wherein the additional portion is disposed forward of the securement portion as measured along the X-axis, and the contact further defines a rear portion defined at a different point along the contact than is the securement portion as measured along the X-axis, and when the securement portion is at least partially disposed within the channel and secured to the base at the channel, the rear portion is disposed lower than the securement portion as measured along the Z-axis.

5. A contact, comprising:

a forward portion defining a first width as measured along a Y-axis;

a first angled portion defining a second width as measured along the Y-axis;

a securement portion defining a third width as measured along the Y-axis;

a second angled portion defining a fourth width as measured along the Y-axis; and a rear portion defining a fifth width as measured along the Y-axis, the forward portion, the first angled portion, the securement portion, the second angled portion and the rear portion being arranged sequentially as measured along an X-axis;

wherein each of the second width and the fourth width is less than each of the first width and the third width; and wherein the securement portion extends along the X-axis between the first angled portion and the second angled portion.

6. The contact of claim 5, wherein at least a portion of the securement portion is higher, as measured along a Z-axis, than is at least a portion of the forward portion.

7. The contact of claim 5, wherein at least a portion of the securement portion is higher, as measured along a Z-axis, than is at least a portion of the rear portion.

8. The contact of claim 5, wherein at least a portion of the securement portion is higher, as measured along a Z-axis, than is at least a portion of the first angled portion.

9. The contact of claim 5, wherein at least a portion of the securement portion is higher, as measured along a Z-axis, than is at least a portion of the second angled portion.

10. The contact of claim 5, wherein the securement portion is adapted to be secured to a base.

11. A connector assembly, comprising:

a base extending along a Y-axis;

a channel extending through the base along an X-axis, opening at two opposed sides of the base spaced apart along the X-axis and comprising a channel engagement feature;

a first contact disposed at least partially within the channel, the first contact defining a securement portion having an engagement portion and an extension portion, the engagement portion being disposed forward of the extension portion along the X-axis, and the engagement portion securing to the base at the channel by engaging the channel engagement feature; and a second contact defining a second contact rear portion, at least a portion of the second contact rear portion being disposed below, as measured along a Z-axis, the extension portion at a location P, the second contact rear portion defining a width as measured along a Y-axis at the location P, wherein a distance between the second contact rear portion and the extension portion at the location P, as measured along the Z axis, is at least as great as the width of the second contact rear portion as measured along the Y-axis at the location P.

12. The connector assembly of claim 11, wherein the distance between the second contact rear portion and the extension portion at the location P is at least as great as 150% of the width of the second contact rear portion as measured along the Y-axis at the location P.

13. The connector assembly of claim 11, wherein the distance between the second contact rear portion and the extension portion at the location P is at least as great as 200% of the width of the second contact rear portion as measured along the Y-axis at the location P.

14. The connector assembly of claim 11, wherein the distance between the second contact rear portion and the extension portion at the location P is at least as great as 250% of the width of the second contact rear portion as measured along the Y-axis at the location P.

15. The connector assembly of claim 11, wherein the distance between the second contact rear portion and the extension portion at the location P is at least as great as 300% of the width of the second contact rear portion as measured along the Y-axis at the location P.

16. The connector assembly of claim 11, wherein the distance between the second contact rear portion and the extension portion at the location P is at least as great as 350% of the width of the second contact rear portion as measured along the Y-axis at the location P.

17. The connector assembly of claim 11, wherein the distance between the second contact rear portion and the extension portion at the location P is at least as great as 400% of the width of the second contact rear portion as measured along the Y-axis at the location P.

* * * * *